(No Model.) 2 Sheets—Sheet 1.

S. HADLOCK.
NIPPERS FOR PILE DRIVERS.

No. 274,189. Patented Mar. 20, 1883.

Witnesses,
Geo. H. Strong.
J. H. Nourse.

Inventor
Saml Hadlock
By Dewey & Co.
Attorney.

(No Model.) 2 Sheets—Sheet 2.

S. HADLOCK.
NIPPERS FOR PILE DRIVERS.

No. 274,189. Patented Mar. 20, 1883.

Witnesses,
Geo. H. Strong.
J. H. Nourse

Inventor
Saml Hadlock
By Dewey & Co.
Attorneys

UNITED STATES PATENT OFFICE.

SAMUEL HADLOCK, OF PORT TOWNSEND, WASHINGTON TERRITORY.

NIPPERS FOR PILE-DRIVERS.

SPECIFICATION forming part of Letters Patent No. 274,189, dated March 20, 1883.

Application filed October 21, 1882. (No model.)

*To all whom it may concern:*

Be it known that I, SAMUEL HADLOCK, of Port Townsend, county of Jefferson, Washington Territory, have invented an Improved Nippers for Pile-Drivers; and I hereby declare the following to be a full, clear, and exact description thereof.

My invention relates to an improvement in nippers for pile-drivers; and it consists in a centrally-hinged strut-brace, pivoted at both ends to and between the sides of the nippers, whereby said sides are held extended to hold the jaws to their grip, and in a means for bending said brace centrally to draw in directly or indirectly the sides to extend the jaws.

It further consists in a peculiar extensible frame, constituting the nippers, in which said brace acts to the best advantage, and in the novel means shown for tripping the nippers, all of which will hereinafter fully appear.

The object of my invention is to provide a nippers which will effectively seize and sustain the weight, and will release it with certainty when desired, without the necessity of having one operator go upon the scaffold above.

The present form of nippers is not certain in its action. Its jaws cannot be greased on account of slipping, and consequently they have often to be pried off by an operator at the top of the machine. To constitute effective nippers, they should be certain in their grip and readily disengaged.

Figure 1:
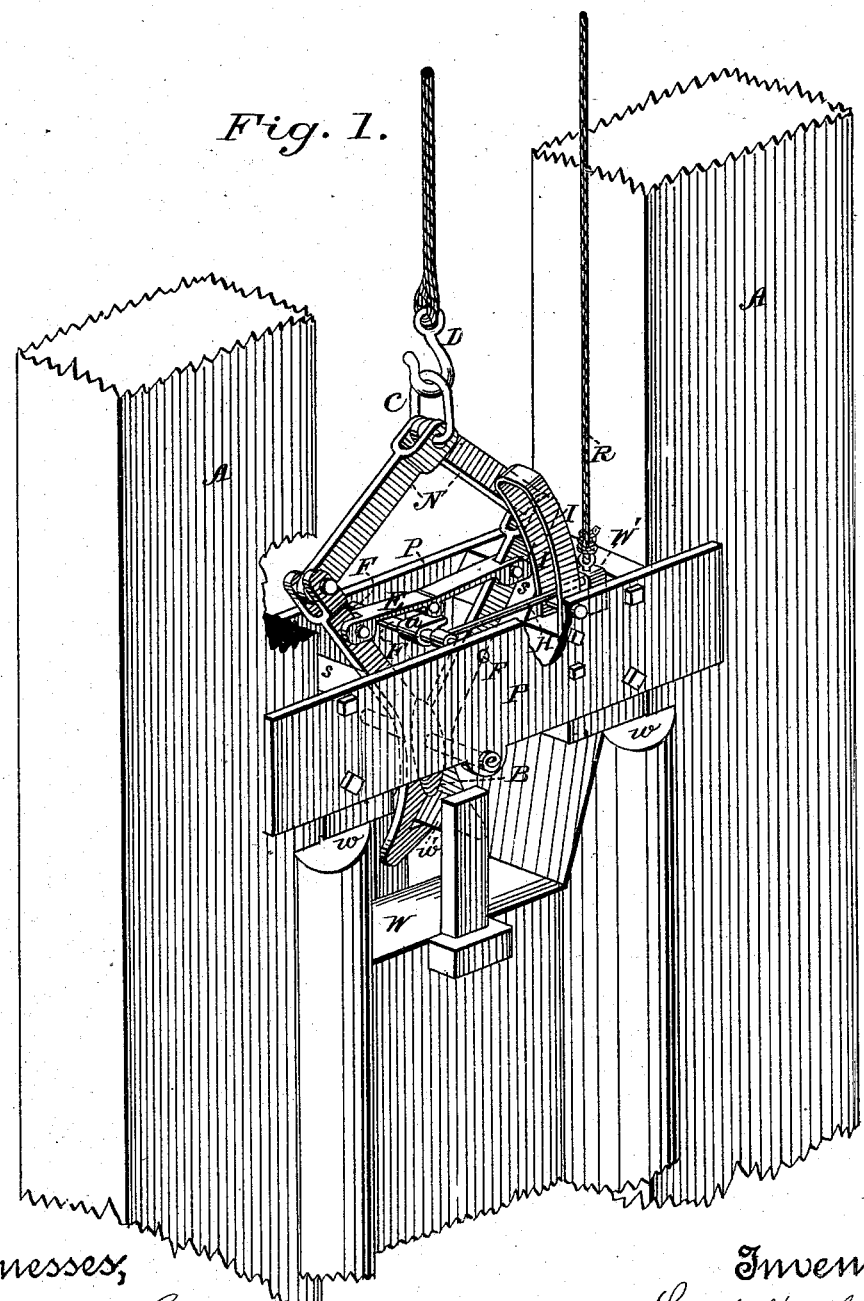
Figure 2:
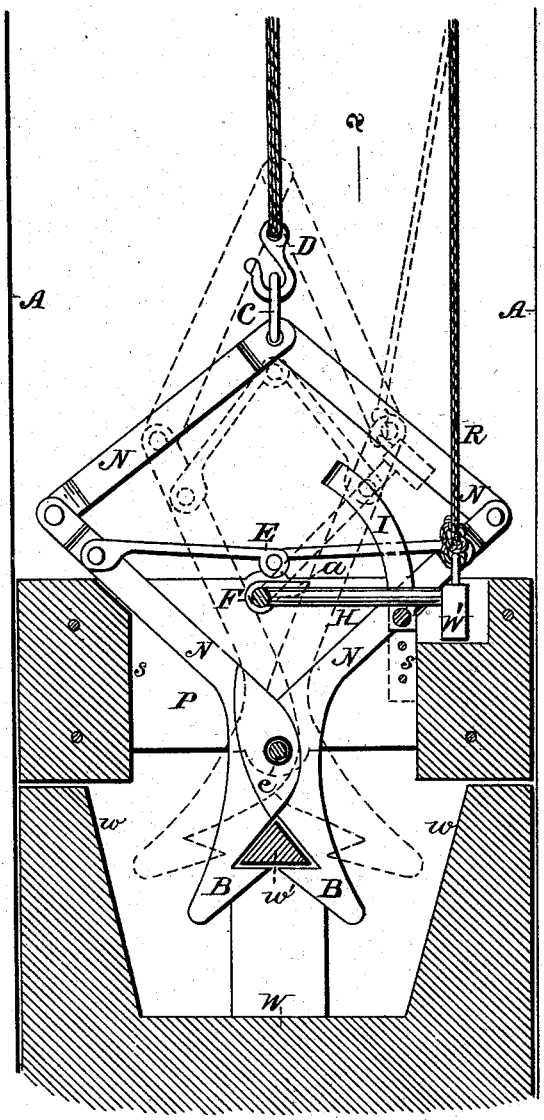
Figure 3:
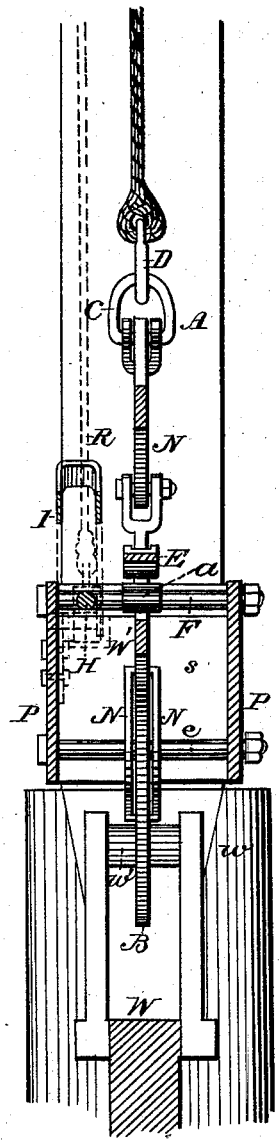

Referring to the accompanying drawings, Figure 1 is a perspective view of my device. Fig. 2 is a section through the weight and side blocks, and a front elevation of the frame N. Fig. 3 is a vertical section on the line 1 2, Fig. 2.

Let A represent the frame of a pile-driver in which the main weight W is adapted to be raised and dropped. This weight is here shown in the usual shape on top, having the inclined sides $w$ and the central V-shaped piece $w'$, with which the nippers engage.

Let N represent an extensible frame, made up of bars, pivoted together, the lower two having the jaws B, in usual shape, pivoted together by a bolt, $e$.

P represents a guide-plate, of which there is one on each side, secured to the nippers by the pivot-bolt $e$. The ends of these plates overlap the frame, and have bolted between them, on the inside of the frame, the blocks $s$, the upper ends of which extend to and support the sides of the frame N, as shown in Fig. 2. The cross-plates P and the block $s$ form guides for the nippers to move up and down the frame.

In the top of the frame N is a ring, C, with which the hook D of the hoisting mechanism is engaged.

Pivoted at both ends to the upper ends of the lower arms of the frame N is the strut-brace E, hinged at its middle in such manner as to bend up but not down. The two parts of this brace are slightly inclined downward to the center, so that the brace can have no tendency to swing up until forced so to do.

Mounted across the plates P is a shaft, F, carrying a cam, $a$, engaging under the hinge of the brace E. A lever, H, is attached to the end of the shaft, and has secured to its other end a rope, R, and a counterbalance-weight, W'.

At the end of one of the guide-plates P is bolted a curved slotted guide, I, through which the end of lever H passes, and by which it is limited in its upward or downward movement.

The operation of the device is as follows: Suppose the jaws B to be secured upon the V-shaped cross-bar of the weight. The hoisting power, which is then applied to the ring C at the top of the frame N and the weight W at the other end, would have a tendency to extend the frame N lengthwise by contracting its sides, in which case it is obvious that the jaws B would release their grip upon the weight; but the frame is prevented from so extending by the strut-brace E, which holds the sides apart and keeps the jaws firmly gripped. When the weight has reached a position to be dropped the rope R, which is suitably guided over pulleys, is pulled upon from below, the lever H is raised in its guide I, the cam $a$ is turned up under the hinge of the brace E, and the latter is forced up at its center. As soon as it passes a straight line, the frame N collapses by extending lengthwise, opening its jaws B, and releasing the weight W. The nippers are now let down in this extended condition until the lower ends of blocks $s$ strike the sides $w$ of the weight at the same time that the expanded jaws B fit over the V-shaped cross-bar $w'$. This relieves the nippers from its extended condition, and the strut-brace E of its own weight drops down into position, extending the sides of the frame N, and causing the jaws B to close in on the V-shaped cross-bar $w'$. The counterbalance-weight W' returns the lever H to position, and the slotted guide I limits its movement, so that the cam is always in position under the brace.

In these nippers the grip is assured whether the jaws be greased or not. They are compelled to hold fast, as they cannot move against the brace. In tripping the nippers, the operator stands at the foot of the frame, and thus is in no danger, which is a great advantage in procuring labor for this purpose. The tripping mechanism is effective, for as soon as the brace is bent the sides must contract and the jaws spread.

The present form of nippers consists in but two bars, corresponding to the lower two of my frame N. The hoisting-power is applied to the pivot shaft or bolt of the two bars. Now it is obvious that if my brace E were applied between the tops of these bars it would act to hold the jaws to their grip in the same manner as in my frame N, and though it would not be as easy to trip, yet if enough power were applied to the cam $a$ it would raise the brace E, and thus draw in the tops of the bars and disengage the jaw from the weight. It will thus be seen that my brace is applicable not only to an extensible frame such as I show, but also to the arms or bars of the ordinary pivoted jaws of nippers. Therefore, while I deem the frame as I have shown it preferable to the pivoted bars, I do not confine myself to it exclusively, but consider my invention to lie chiefly in the pivoted hinged strut-brace, operating when extended to hold the jaws to their grip, and when bent to release them directly or indirectly.

Having thus described my invention, what I claim as new, and desire to secure by Letters Patent, is—

1. In nippers for pile-drivers, the centrally-hinged strut-brace E, pivoted at each end to and between the nippers above their pivot-point, and operating when extended to hold the jaws to their grip, and when bent to permit the jaws to open and release the hammer, substantially as herein described.

2. Nippers for pile-drivers having jaws B B, in combination with the centrally-hinged strut-brace E, pivoted at each end to and between the upper ends of the lower nipper arms, and a means for bending said brace at its center to draw in said upper ends and extend the jaws of the nippers, substantially as herein described.

3. Nippers for pile-drivers consisting of the extensible frame N, having jaws B, the centrally-hinged strut-brace E, pivoted to and between the sides of the frame, and a means for centrally bending said brace to relieve the sides of the frame N, substantially as and for the purpose set forth.

4. Nippers for pile-drivers, consisting of the extensible frame N, having jaws B, the centrally-hinged strut-brace E, pivoted to and between the sides of the frame, and the means for tripping said brace to relieve the frame, consisting of the shaft F, cam $a$, operating against said brace, weighted lever H, and rope R, subtantially as herein described.

In witness whereof I have hereunto set my hand.

SAMUEL HADLOCK.

Witnesses:
S. H. NOURSE,
G. W. EMERSON.